United States Patent [19]

Kessler

[11] Patent Number: 4,478,516
[45] Date of Patent: Oct. 23, 1984

[54] APPARATUS FOR MIXING AND BLENDING CONSTITUENTS OF A FLOW OF THERMOPLASTICS MATERIAL

[76] Inventor: Milton Kessler, 6690 Harrington Ave., Youngstown, Ohio 44512

[21] Appl. No.: 428,907

[22] Filed: Sep. 30, 1982

[51] Int. Cl.³ .............................................. B29B 1/06
[52] U.S. Cl. ...................................... 366/87; 138/42; 366/340; 425/199; 425/204
[58] Field of Search .................. 366/87, 336, 340, 96; 425/197, 198, 199, 204; 48/189.4; 138/42

[56] References Cited

U.S. PATENT DOCUMENTS

| | | | |
|---|---|---|---|
| 1,448,151 | 3/1923 | Reeves | 48/189.4 |
| 2,251,371 | 8/1941 | Moyer et al. | 48/189.4 |
| 3,792,839 | 2/1974 | Gidge | 366/87 |
| 3,817,675 | 6/1974 | Maiocco | 425/207 |
| 4,249,877 | 2/1981 | Machen | 425/204 |

Primary Examiner—Philip R. Coe
Attorney, Agent, or Firm—David A. Burge

[57] ABSTRACT

The constituents of a flow of thermoplastics material or the like are mixed and blended by passing the flow through a mixing structure which defines an array of elongate side-by-side passages. The passages are not all alike in that at least some of them have configurations which taper along their lengths to degrees or in directions that differ from the configurations of others of the passages, whereby the flows of fluid which discharge from the differently configured passages do so at differing velocities. As the discharging flows of differing velocities recombine to form a common flow having a uniform velocity, a desirable type of mixing and blending action results. In preferred practice, adjacent ones of the passages are tapered oppositely along their lengths to converge or diverge such that fluid flowing through the converging passages is caused to increase in velocity, while fluid flowing through the diverging passages is caused to diminish in velocity. An enhanced mixing and blending effect is achieved by positioning a plurality of these mixing structures in series at spaced locations along the fluid flow path. Where the mixing structures are formed from a good heat-conducting material, they may be heated and used in cooperation with heated walls of the body which defines the fluid flow path to heat the material being mixed and blended to achieve a more thorough melting of its constituents.

10 Claims, 6 Drawing Figures

APPARATUS FOR MIXING AND BLENDING CONSTITUENTS OF A FLOW OF THERMOPLASTICS MATERIAL

BACKGROUND OF THE INVENTION

1. Field of the Invention

The present invention relates to apparatus for mixing and blending flows of thermoplastics material and the like, and, more particularly, to the use thereof in plastics extrusion and injection molding machinery.

2. Prior Art

It is important in many fluid flow applications that the constituents of a flow of viscous material be intermixed as the material is fed along a confined flow path. One such application which has long presented a challenge to those skilled in the art is the need to thoroughly mix semi-solid constituents of a flow of thermoplastics material as the material is being heated and melted in a plastics forming machine for delivery to an extrusion die or an injection mold.

In thermoplastics extrusion and injection molding machinery, it is customary to load solid pieces of plastics material, in granular or pellet form, into a hopper. The hopper, in turn, ducts this material into an elongate, barrel-like, auger-fed body for heating and blending as the material is fed under pressure along a confined flow path defined by the body. As the particles or pellets precess along the flow path, they begin to melt and take on a semi-solid form. If these semi-solid constituents are not uniformly melted, mixed and blended before they are fed through an extrusion die or into an injection mold, a plastics product lacking in homogeneity may result. Where plastics products having intricate, and/or thin cross-sectional portions are being formed, these products are particularly susceptible to malformation in the presence of almost any lack of homogeneity in the supply of production material.

A further problem which is often caused by incomplete mixing and blending of a supply of heated thermoplastics material is non-uniform coloring of the resulting plastics product. In the forming of colored plastics products, particles of colorant are introduced simultaneously with pellets of thermoplastics resin into the barrel-like body of an auger-fed plastics forming apparatus for concurrent melting and mixing. The colorant is selected to impart a desired color to the base resin, and when properly mixed therewith during heating, provides a homogeneous flow of thermoplastics material which may be utilized to form a plastics product of desired color. However, if the colorant is not thoroughly and uniformly mixed and blended with the base resin, the resulting plastics product will exhibit unwanted non-uniformities in color.

Non-uniform mixing of a flow of thermoplastics material can result, in part, from differences in the sizes of the particles which are being mixed and melted. Smaller particles tend to melt more readily than larger particles. If the larger particles are incompletely melted, their material does not become thoroughly intermixed with the material of the smaller particles. A more thorough melting of the constituents of a flow of large and small particles can be effected if, as the material is heated and fed along a flow path, the larger particles in the mixture are effectively brought into engagement with the heated inner surfaces of the barrel-like body so that these large particles can absorb sufficient heat energy to melt properly.

One type of approach which has been taken in an effort to achieve better mixing and blending of flows of thermoplastics material has been to alter the configurations of augers used to feed the flows Proposed auger improvements have included auger pitch modifications which are intended to progressively increase or otherwise vary the feed pressure of the flow as it moves through the barrel-like body. Although a variety of auger-related improvements have been proposed, incomplete mixing continues to pose a problem.

Another proposed approach has been to position devices such as screens, sieves, or plates having arrays of straight-through holes across a fluid flow path to cause flowing fluid to divide itself into a plurality of individual flows for passage through these devices, whereafter the flows recombine. To the degree that proposals of this type have provided any improvement in mixing, the result, in most instances, has not been satisfactory, especially in the environment of a plastics forming machine where the thermoplastics material to be mixed and blended is in the process of being melted, is in something of a semi-solid state, and is sufficiently viscous to seriously resist ordinary efforts to effect a proper mixing and blending action.

There remains a need for a simple and effective system for properly and thoroughly mixing and blending the constituents of flow of viscous material such as the constituents of a flow of thermoplastics material as they are being melted and caused to flow under pressure through the barrel-like body of a plastics forming machine.

SUMMARY OF THE INVENTION

The present invention overcomes the foregoing and other drawbacks of prior proposals, by providing a novel and improved apparatus for mixing and blending the constituents of a flow of viscous material.

In accordance with the preferred practice of the present invention, a structure for mixing and blending constituents of a flow of thermoplastics material or the like defines an array of side-by-side passages. The mixing structure is positioned along a path of travel followed by a flow of thermoplastics material, the constituents of which are to be mixed and blended. The structure causes the flow to be divided into a plurality of individual flows each traveling through a separate one of the passages. The passages are not identical one with another. Selected ones of the passages change in cross-section along their lengths such that at least some of the individual flows of fluid which discharge from the various passages are caused to discharge at velocities which differ from flows discharging from others of the passages. As the discharging flows of different velocities recombine, a mixing and blending action results.

In preferred practice, adjacent ones of the passages are tapered oppositely, convergently and divergently along their lengths. The converging passages cause their flows to converge and increase in velocity. The diverging passages cause their flows to diverge and diminish in velocity. By this arrangement, the flows which discharge from adjacent, oppositely-tapered passages have a maximum differential in velocity which enhances the type of mixing and blending action that results as the flows recombine.

A feature of the present invention lies in the provision of a mixing structure of extremely simple form which provides improved mixing without requiring any moving parts. Indeed, in preferred practice, the mixing structure is of one-piece construction, taking the form of a plate having tapered, elongate holes formed therethrough. Preferably the plate has a thickness that is about five times the minimum width or minimum diameter of the narrowest passage dimension defined by the plate. Preferably the passages take the form of truncated cones having sidewalls which taper uniformly at angles of about five degrees relative to the central axes of these passages. A plurality of these mixing plates may be used in series along a fluid flow path to further enhance the resulting mixing and blending effect.

A further feature of the invention results where the mixing plates are formed from a good heat-conducting material and are heated so that they can assist in imparting heat energy to the flows of material which pass through their passages. By this arrangement, the plates help to achieve a thorough melting of the constituents of the flows.

Still another feature of the invention lies in the case with which it enables existing plastics forming machinery such as extrusion and injection molding equipment to be retrofitted to obtain the benefits of the invention through the addition of one or more of the described mixing structures.

BRIEF DESCRIPTION OF THE DRAWING

The foregoing and other features of the present invention will be better understood by referring to the description of the preferred embodiment and the claims which follow, taken together with the accompanying drawing, wherein:

DESCRIPTION OF THE PREFERRED EMBODIMENT

Figure 1:
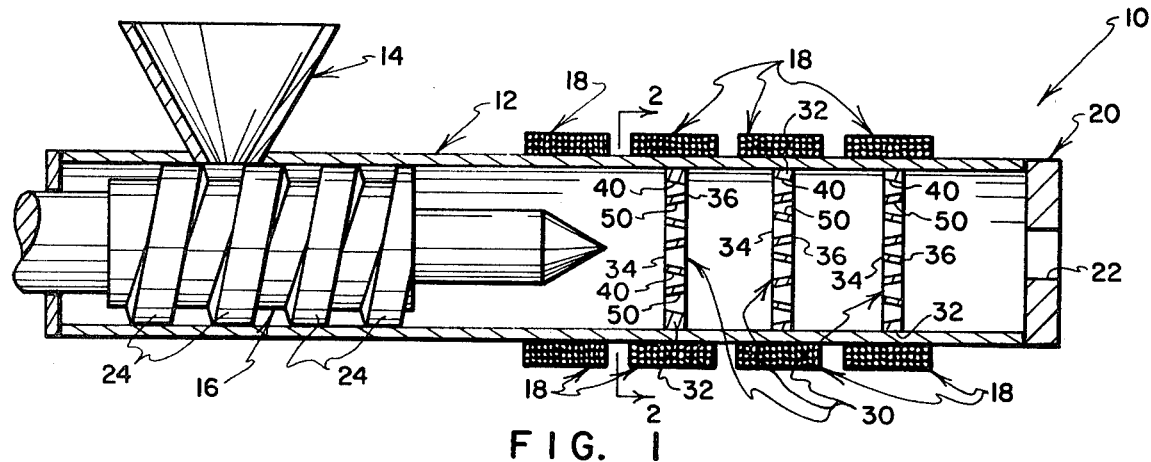
FIG. 1 is a schematic view, principally in cross-section, of a plastics forming apparatus embodying features of the preferred practice of the present invention.

Referring to FIG. 1, a plastics forming apparatus is indicated generally by the numeral 10. The apparatus 10 may comprise either a portion of a plastics extrusion apparatus or a plastics injection molding apparatus. The apparatus 10 includes an elongate, barrel-like body 12, a hopper 14, a rotatable screw-type advance mechanism or auger 16, body-encircling heater bands 18, and an end structure 20 which defines a discharge opening 22. The apparatus 10 is shown as being provided with a series of mixing structures indicated generally by the numeral 30. While the structures 30 are illustrated as being identical one with another, they may each take on different forms which present a variety of types and combinations of elongate through-passages, as will be explained.

Pellets or granules of thermoplastics material (not shown) are loaded into the body 12 through the hopper 14. Rotation of the auger 16 causes the thermoplastics material to precess along a path of flow defined by the inner walls of the body 12. The auger 16 has helical lands 24 which move the thermoplastics material along this flow path (rightwardly as viewed in FIG. 1) toward the discharge opening 22 as the auger 16 is rotated. The heater bands 18 extend about selected portions of the body 12 and serve to heat the body 12 to raise the temperature of the thermoplastics material contained therein. As the thermoplastics material is heated and begins to melt, it takes on something of a semi-solid state.

In FIG. 1, some of the heater bands 18 are shown as encircling locations where the mixing structures 30 are installed within the body 12. Positioning at least some of the heater bands 18 in this manner can be advantageous. If the mixing structures 30 are formed from a good heat-conducting material, they will become hot under the influence of the surrounding heater bands 18, and will help to heat the thermoplastics material which flows through these structures, thereby helping to more thoroughly melt this material.

The mixing structures 30 intercept the flow of thermoplastics material and cause it to be thoroughly and completely mixed and blended. As will be explained with reference to several forms of mixing structure embodiments which are shown in FIGS. 2–6, the mixing structures 30 define through-passages of non-uniform cross-section which cause the flows of material which discharge from the passages to discharge at different velocities.

Each of the structures 30 includes a plate 32 which is of a suitable size for positioning within the body 12 so as to extend across and intercept the full width of the path of flowing thermoplastics material. The plates 32 cause the flow (1) to divide, (2) to change in velocity, and (3) to recombine, the overall result of which is the execution of a very desirable type of mixing and blending action. The plates 32 are positioned within the body 12 of the extruder 10 at locations spaced downstream from the auger 16, but upstream from the discharge opening 22. Each of the plates 32 has an upstream face 34 and a downstream face 36.

Figure 2:
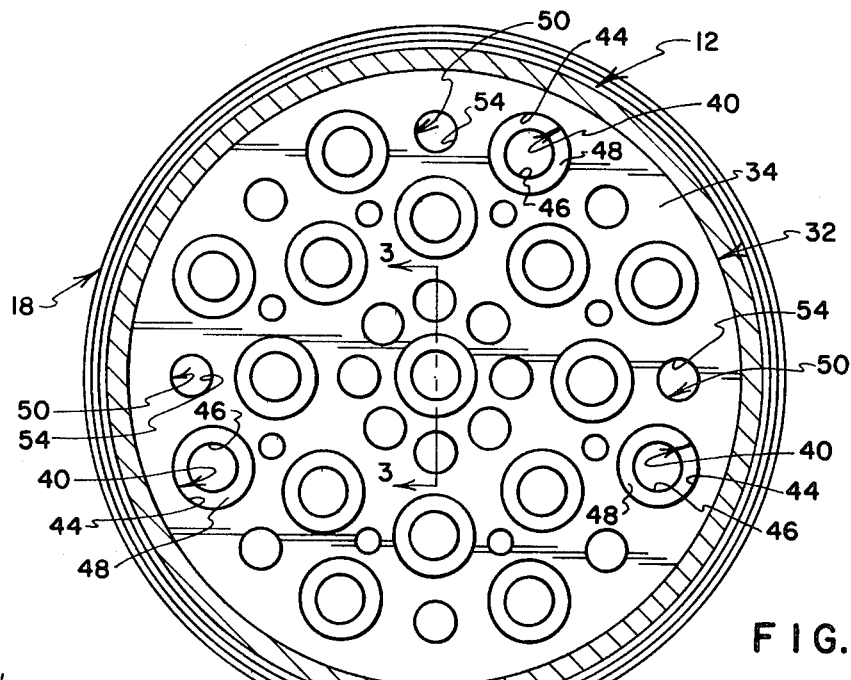
FIG. 2 is a sectional view, on an enlarged scale, as seen from a plane indicated by a line 2—2 in FIG. 1.

Referring to FIG. 2, each of the plates 32 preferably defines first and second sets of oppositely tapered, converging and diverging passages 40, 50 through which portions of the thermoplastics material must flow. The passages 40, 50 are preferably arranged so that each of the converging passages 40 has at least one of the diverging passages 50 located adjacent to it.

The passages 40 each have a round inlet 44 which opens through the upstream face 34, and a round outlet 46 which opens through the downstream face 36. The inlet 44 has a greater cross sectional area than the outlet 46. The inlets and outlets 44, 46 are connected by uniformly tapered surfaces 48 which define converging passages 40 of truncated-conical form.

The passages 50 each have a round inlet 54 which opens through the upstream face 34, and a round outlet 56 which opens through the downstream face 36. The inlet 54 has a lesser cross sectional area than the outlet 56. The inlets and outlets 54, 56 are connected by uniformly tapered surfaces 58 which define diverging passages 50 of truncated-conical form.

In operation, as a flow of thermoplastics material is fed through the barrel-like body 12 toward the series of mixing structures 30, each of the plates 32 causes its approaching upstream flow to divide into a plurality of individual flows for travel through the passages 40, 50. As the individual flows travel through the converging and diverging passages 40, 50, their flow velocities are caused to change. As the various flows discharge from the passages 40, 50, they do so at differing velocities. As the discharging flows of differing velocities are caused to recombine on the downstream side of the plate 32, a considerable amount of churning and random mixing movement takes place These various dividing, velocity-changing, discharging, and recombining actions cooperate synergistically to provide a very desirable type of mixing and blending action which, in the difficult environment of a plastics forming machine, is highly effective in causing semi-solid thermoplastics materials being melted to become thoroughly mixed and blended.

As the flow of thermoplastics material approaches one of the plates 32, it is caused to divide for entry into the passages 40, 50 through the inlets 44, 54. Such flow portions as travel through the passages 40 are caused to converge and increase in velocity, whereupon these flow portions discharge from the passages 40 through the outlets 46 at relatively high velocities. Such flow portions as travel through the passages 50 are caused to diverge and decrease in velocity, whereupon these flow portions discharge from the passages 50 through the outlets 56 at relatively low velocities. The individual flows discharging from the passages 40, 50 recombine on the downstream side 36 of the plate 32 in a churning type of multi-directional movement as the individual flows are ultimately recombined to form a common flow having a uniform velocity.

Still another desirable effect which results through the use of the mixing structures 30 is that, as the flow of highly viscous thermoplastics material is caused to divide, change in velocity, discharge, and recombine, the energy consumed in effecting these actions, in and of itself, causes a further heating of the flowing material. While the resistance posed to fluid flow by the plates 32 is preferably minimized by maximizing the area of the passages 40, 50, and by minimizing the intervening area of the plate structure 32 which poses resistance to fluid flow, a certain amount of resistance to flow is inevitable, and it tends to cause heating of the plate 32 as well as heating of the material which flows through the passages 40, 50 of the plate 32.

Although the mixing structures 30 have been described in their preferred form as defining sets of oppositely-tapered passages 40, 50 it will be understood that a wide variety of passage combinations can be employed to obtain the blending action described. While the passages 40, 50 have been described as being uniformly tapered along their lengths, and as being of generally truncated-conical shape, it will be appreciated that the passages 40, 50 may take on a wide variety of forms so long as selected ones of the passages differ in configuration from others of the passages so that differential discharge velocities result.

Figures 3, 4, 5, 6:
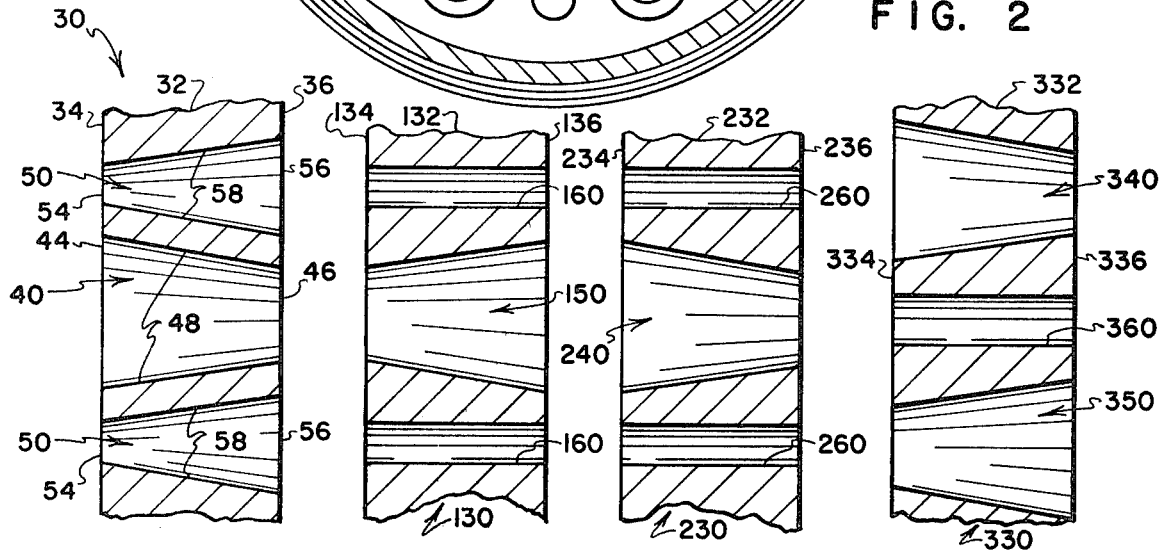
FIG. 3 is a sectional view, on an enlarged scale, as seen from a plane indicated by a line 3—3 in FIG. 2; and, FIGS. 4–6 are sectional views similar to FIG. 3 illustrating alternate, less-preferred embodiments of the invention.

In FIG. 4 an alternate form of mixing structure 130 is shown in the form of a plate 132 having upstream and downstream faces 134, 136. The plate 132 has diverging passages 150 which are similar to the passages 50. The passages 150 are in side-by-side relationship with passages 160 which are of uniform cross-section along their lengths. While the non-tapered passages 160 do not cause the flows which pass therethrough to change in velocity, the flows which pass through the diverging passages 150 will decrease in velocity, whereupon such flows as discharge from adjacent one of the passages 150, 160 will differ in velocity and will effect a mixing and blending action as they recombine on the downstream side of the plate 132.

In FIG. 5 another embodiment of mixing structure 230 is shown in the form of a plate 232 having upstream and downstream converging passages 240 which are similar to the passages 40. The passages 240 are in side-by-side relationship with non-tapered passages 260 which are similar to the previously-described passages 160. The flows exiting from the passages 240 will have higher velocities than the flows exiting from the passages 260, thereby causing a desirable type of mixing and blending action to take place on the downstream side of the structure 230 as the flows recombine.

Referring to FIG. 6, still another embodiment of mixing structure 330 is shown which includes converging passages 340, diverging passages 350, and passages 360 located among the passages 340, 350. In this configuration, the converging passages 340 will cause their flows to increase in velocity, the diverging passages 350 will cause their flows decrease in velocity, and the non-tapered passages 360 will not alter the velocities of their flows. As the various flows discharge from the passages 340, 350, 360, their differing velocities will cause a desirable type of mixing and blending action to take place as the flows recombine on the downstream side of the structure 330.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentability exist in the invention disclosed.

What is claimed is:

1. A device for mixing and blending constituents of a fluid as the fluid is fed along a path of flow, comprising:
    (a) structure defining a confined path of flow for movement of a fluid from an upstream location along the path of flow to a downstream location along the path of flow;
    (b) mixing means:
        (i) for positioning across the path of flow at a location intermediate the upstream and downstream locations, and having an upstream side near the upstream location, and a downstream side near the downstream location;
        (ii) for defining a plurality of elongate passages of substantially round cross section, with the passages extending in directions which substantially parallel the direction of the path of flow, with at least one of the passages being of a first type, with at least one other of the passages being of a second type, with at least another of the passages being of a third type, and with the passages of the first, second and third types extending from the upstream side of the mixing means to the downstream side thereof for causing a flow of fluid moving along the path of flow to divide itself in the vicinity of the upstream side of the mixing means into a plurality of individual flows for travel through the passages of the mixing means, with each of the individual flows traversing a separate one of the passages, discharging therefrom and recombining with the other individual flows in the vicinity of the downstream side of the mixing means;

(c) the passages of the first type being divergently tapered along at least portions of their lengths for causing such individual flows of fluid as traverse the passages of the first type to execute a reduction in flow velocity as these individual flows of fluid traverse the passages of the first type;

(d) the passages of the second type being convergently tapered along at least portions of their lengths for causing such individual flows of fluid as traverse the passages of the second type to execute an increase in flow velocity as these individual flows traverse the passages of the second type;

(e) the passages of the third type being substantially uniform in cross section along their lengths for causing such individual flows of fluid as traverse the passages of the third type to execute neither a reduction nor an increase in flow velocity as these individual flows traverse the passages of the third type; and, (f) the passages of the first, second and third types being arranged in a closely spaced array with passages of the first and second types being intermingled in the array among passages of the third type whereby, when flows of fluid discharge therefrom and recombine, the three different velocities at which flows discharge from the passages of the first, second and third types causes these flows to execute effective mixing actions as the flows recombine in the vicinity of the downstream location.

2. The device of claim 1 wherein the material from which the device is formed is selected to have relatively good heat-conducting capability, and heating means is provided for heating the device so that, as fluid comes into contact with the device and traverses its passages, heat energy is imparted to the fluid.

3. A mixing device for positioning within a plastics-forming apparatus between an upstream location and a downstream location along a path of flow followed by thermoplastics material, being fed through a body of the apparatus, comprising:

(a) mixing means including a structure for positioning in a body of a plastics-forming apparatus along a path of flow of thermoplastics material between an upstream location and a downstream location with the structure having an upstream side for positioning near the upstream location, and a downstream side for positioning near the downstream location, with the structure defining a plurality of elongate through passages for ducting thermoplastics material along the path of flow from the upstream side to the downstream side as thermoplastics material is fed under pressure through the body;

(b) the elongate passages including first, second, and third types of passages, with each of the passages being of substantially round cross section and extending from the upstream side to the downstream side, with the passages of the first type being divergently tapered along their lengths for causing fluid being ducted therethrough to diminish in velocity, with the passages of the second type being convergently tapered along their lengths for causing fluid being ducted therethrough to increase in velocity, and with the passages of the third type being substantially uniform in cross section along their lengths for causing flows of fluid being ducted therethrough to travel at substantially uniform velocities; and, (c) the passages of the first, second and third types being arranged in a closely spaced array with passages of the first and second types being intermingled in the array among passages of the third type whereby, when flows of fluid discharge from the passages and recombine, the three different velocities at which flows discharge from the passages of the first, second and third types causes these flows to execute effective mixing actions as the flows recombine in the vicinity of the downstream location.

4. The device of claim 3 wherein the material from which the device is formed is selected to have relatively good heat-conducting capability, and heating means is provided for heating the device so that, as fluid comes into contact with the device and traverses its passages, heat energy is imparted to the fluid.

5. The device of claim 3 wherein the plastics-forming apparatus is an extrusion device.

6. The device of claim 3 wherein the plastics-forming apparatus is an injection molding device.

7. An apparatus for forming a plastics extrusion, comprising:

(a) extruder means for receiving thermoplastics material, for heating and moving the material along a path of flow from an upstream location to a downstream location and toward a die for extrusion;

(b) the extruder means including structure defining the path of flow;

(c) mixing means positioned within the structure along the flow path:

(i) for positioning across the path of flow at a location intermediate the upstream and downstream locations, and having an upstream side near the upstream location, and a downstream side near the downstream location;

(ii) for defining a plurality of elongate passages of substantially round cross section, with the passages extending in directions which substantially parallel the direction of the path of flow, with at least one of the passages being of a first type, with at least one other of the passages being of a second type, with at least another of the passages being of a third type, and with the passages of the first, second and third types extending from the upstream side of the mixing means to the downstream side thereof for causing a flow of fluid moving along the path of flow to divide itself in the vicinity of the upstream side of the mixing means into a plurality of individual flows for travel through the passages of the mixing means, with each of the individual flows traversing a separate one of the passages, discharging therefrom and recombining with the other individual flows in the vicinity of the downstream side of the mixing means;

(c) the passages of the first type being divergently tapered along at least portions of their lengths for causing such individual flows of fluid as traverse the passages of the first type to execute a reduction in flow velocity as these individual flows of fluid traverse the passages of the first type;

(d) the passages of the second type being convergently tapered along at least portions of their lengths for causing such individual flows of fluid as traverse the passages of the second type to execute an increase in flow velocity as these individual flows traverse the passages of the second type;

(e) the passages of the third type being substantially uniform in cross section along their lengths for causing such individual flows of fluid as traverse the passages of the third type to execute neither a reduction nor an increase in flow velocity as these individual flows traverse the passages of the third type; and, (f) the passages of the first, second and third types being arranged in a closely spaced array with passages of the first and second types being intermingled in the array among passages of the third type whereby, when flows of fluid discharge therefrom and recombine, the three different velocities at which flows discharge from the passages of the first, second and third types causes these flows to execute effective mixing actions as the flows recombine in the vicinity of the downstream location.

8. The device of claim 7 wherein the passages of the first type each are of generally truncated-conical shape.

9. The device of claim 7 wherein the passages of the second type each are of generally truncated-conical shape.

10. The device of claim 7 wherein the material from which the device is formed is selected to have relatively good heat-conducting capability, and heating means is provided for heating the device so that, as fluid comes into contact with the device and traverses its passages, heat energy is imparted to the fluid.

* * * * *